455/12

United States Patent

Bond

[15] 3,641,432

[45] Feb. 8, 1972

[54] RADIO POSTAL SYSTEM ACKNOWLEDGEMENT APPARATUS

[72] Inventor: Donald S. Bond, Princeton, N.J.

[73] Assignee: RCA Corporation

[22] Filed: July 26, 1968

[21] Appl. No.: 747,950

[52] U.S. Cl. ..........325/4, 178/6, 325/5

[51] Int. Cl. ..........H04b 1/50, H04b 7/20

[58] Field of Search ..........325/3, 4, 5, 427, 2, 31, 55; 178/6.8, 6

[56] References Cited

UNITED STATES PATENTS

| | | | |
|---|---|---|---|
| 3,151,295 | 9/1964 | Haviland | 325/3 |
| 3,315,164 | 4/1967 | Ferguson | 325/4 |
| 3,378,845 | 4/1968 | Welber | 343/100 |
| 3,487,169 | 12/1969 | Miyagi | 179/15 |

*Primary Examiner*—Robert L. Griffin
*Assistant Examiner*—Kenneth W. Weinstein
*Attorney*—Eugene M. Whitacre

[57] ABSTRACT

Acknowledgement apparatus for use in a radio postal system of the type employing an orbiting relay satellite for transmission, including receiver reply circuits operating at a narrower bandwidth and with a lower signal-to-noise ratio than are associated with corresponding transmitter message circuits so as to enable use of reply circuits of substantially reduced power.

5 Claims, 4 Drawing Figures

INVENTOR
DONALD S. BOND
BY Charles Brodsky
ATTORNEY

INVENTOR
DONALD S. BOND
BY Charles Brodsky
ATTORNEY

RADIO POSTAL SYSTEM ACKNOWLEDGEMENT APPARATUS

This invention relates to radio transmission systems and, more particularly, to a radio facsimile postal system providing high-speed mail service with complete privacy.

Such a system is disclosed in my pending application Ser. No. 701,642, filed Jan. 30, 1968, and entitled "Radio Facsimile Postal System", now U.S. Pat. No. 3,594,495. As is therein described, a "radio mailbox" is included in which a deposited letter to be sent is electronically scanned and converted into corresponding image signals. Coaxial lines, radio relay links, or the like, are also included, to transmit those image signals to a central or "electronic," post office, where a computer or other appropriate storage unit adds a predetermined electrical address code to the image signals, indicative of the name and address of the one person for whom the letter is destined. The composite message, i.e., image and code signals together, are then directed by way of an included transmitter and either microwave relay network or satellite in synchronous equatorial orbit, for example, to that geographical area in which "delivery" is to be made. A radio facsimile recorder located at the situs of the addressee is further included, and conditioned to respond only to message signals having that identifying address code, to provide a permanent copy of the transmitted letter.

It will be readily apparent that a postal system of this type can greatly simplify the delivery of mail, especially on a cross country and transoceanic basis. Not only will such a system significantly reduce the time between sending and receipt of mail, but the tremendous rail, plane and ship tonnages involved in such delivery will also be greatly cut. By further providing for the return of the deposited letter to the sender immediately after it has been converted into a video message, substantially complete privacy is assured because no one other than the sender and the addressee will have access to the letter.

It will also be apparent that the scope of such a postal system can be greatly enhanced by providing apparatus for indicating the readiness of the receiver to record message transmissions and for acknowledging the receipt thereof, or, for indicating that the receipt of the transmission has not occurred. A reply signal can be transmitted in the first instance, for example, to direct the central post office to begin its transmission, and, in response to a later signal, to discontinue it as the transmission has been received. In the second instance, the absence of the later reply signal can cause the central post office to repeat the message transmission attempt until informed of its receipt. In either case, the inclusion of auxiliary message decoder and reply transmitter apparatus at the addressee's receiver can effectively extend the usefulness of the central office computer by controlling its directed message transmission, message repetition and message termination.

When considering this additional reply transmission arrangement in conjunction with that embodiment of the Ser. No. 701,642 postal system application (U.S. Pat. No. 3,594,495employing a synchronous satellite as the "delivery link," one might well conclude that the addressee's auxiliary transmitter would have to be of comparable power to that aboard the satellite. This is because the distance between satellite and receiver would be the same for the message transmission as for the reply transmission, and because the power loss in space communication would be substantially the same in either "up" or "down" direction. It is obvious that to develop a comparable reply power of the order of hundreds of watts would necessitate the use of equipment by the addressee which would greatly increase the cost of his recorder apparatus and, also, the amount of interference produced.

In accordance with the invention, however, acknowledgement apparatus can be had requiring an addressee reply transmitter of power substantially less than that of the satellite message transmitter, by a factor of the order of one ten-thousandth-to-one. This follows from the unexpected realization that the reply channel can continue to operate effectively at a narrower band width and with a lower signal-to-noise ratio that that associated with the message channel. A typical reply channel might then be required to provide only 10 milliwatts of power, for example, making such apparatus readily susceptible to fabrication using integrated circuit techniques. The resulting equipment cost and space savings to the addressee will be apparent.

The novel features which are considered to be characteristic of this invention are set forth with particularity in the appended claims. The invention itself, however, both as to its organization and method of operation as well as objects and advantages thereof, will best be understood from the following description when read in connection with the accompanying drawing in which:

FIG. 1 is a pictorial diagram showing a radio facsimile postal system of the type described in the Ser. No. 701,642 application; (U.S. Pat. No. 3,594,495)

Figure 1:
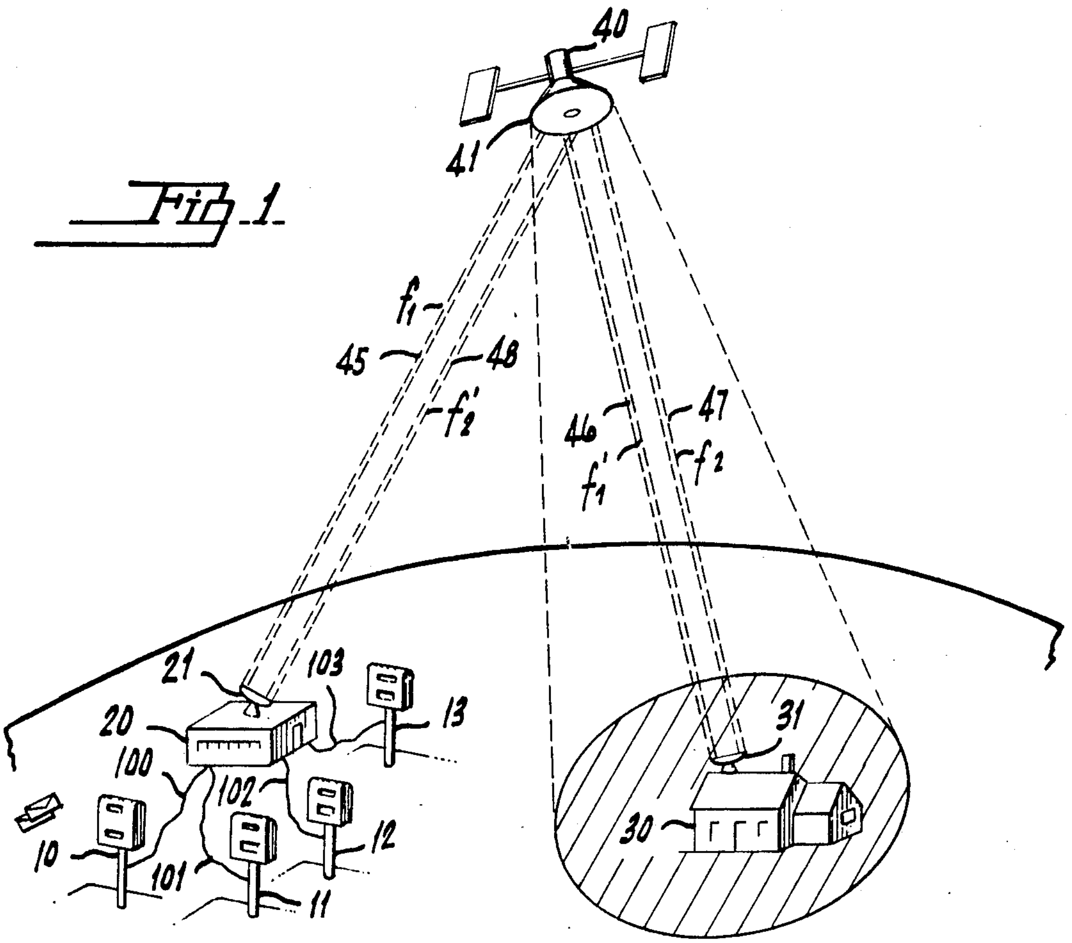

Referring now to FIG. 1, the radio facsimile postal system pictorially shown includes a central or "electronic" post officel 20 coupled by means of coaxial lines, radio relay links, or the like, 100, 101, 102, 103, etc., to a plurality of electronic scanner units or "radio mailboxes" 10, 11, 12, 13, etc. When an information storage unit in the central post office 20 which serves the sender's "radio mailbox" is ready and comes on the line, a signal is sent from the post office (in much the same way as with a telephone dial tone) directing an electronic scanner included in the selected "mailbox" to verify the postage affixed to a deposited letter or other type of written communication. The scanner is also conditioned to scan the letter and to convert its heading address and message into video or image representative signals. These image signals are then carried along the "mailbox" connecting line 100, 101, 102 or 103, etc., to the central office 20, where they are recorded in an information storage unit associated with the electronic scanner unit in use, along with an addressee identifying code provided by an included data processing memory file.

The central post office also includes a plurality of units which serve to combine individual messages and codes and to concentrate the resulting composite messages for later, successive communications. More particularly, each of such units function to store in numerical sequence the individual messages serially recorded in each of the plurality of information storage units prior to a single communication by one of the transmitter units in the post office.

One arrangement for the transmission of these composite messages to the desired addressee disclosed in the aforementioned Ser. No. 701,642 application (U.S. Pat. No. 3,594,495) employs one or more satellites operating in synchronous equatorial orbit. Transmissions from New York to an addressee location in the midwestern part of the United States, for example, can be accomplished by directing a first post office transmitter at a satellite located on the 90° west meridian, while similar transmission to an address location on the west coast of the United States can be accomplished by directing a second transmitter at a satellite located on the 120° west meridian. Mail "deliveries" for specific localities served by these satellites can be had by radiating from the satellite from several transmitters included thereon, operating on a different frequency for each location and beamed into the same general geographical area, or on the same frequency for all locations but beamed into different geographical areas.

The radio facsimile postal system of FIG. 1 shows such an arrangement and, more particularly, one in which the transmission is from the central post office 20 to a specific home location 30 by means of the orbiting satellite 40. Facsimile messages may typically be transmitted at a data rate of the order of $5 \times 10^5$ elements, or bits, of information per 100 milliseconds, and with a band width approximately 10 MHz. in order to provide adequate resolution of printed copy at the home receiver. Two cascaded radio links 45 and 46 are shown--one, the up-link radio beam 45 from the central post office antenna 21 to the satellite antenna 41 and the other, the down-link beam 46 from antenna 41 to the antenna 31 at the home receiver location 30. The operating frequency of the up-link 45 may be designated $f_1$ while that of the down-link 46 may be designated $f_1'$. Frequency $f_1$ may be of the order of 2,500 MHz., with frequency $f_1'$ differing therefrom by 50 MHz. or so.

The receiving unit of the "electronic" postal system of FIG. 1 includes at the home location 30 a radio facsimile recorder and, as indicated above, an antenna 31 for receiving the message transmissions. In practice, almost every home and office might be equipped with one of these units--each, however, being preset with its own unique identifying code corresponding to that interposed with the image representative signals at the central post office location. Although all such units are capable of receiving the transmitted image and code signals, only that one recorder at the location of the assigned addressee having a corresponding identifying code will be activated to reproduce the transmitted message from the image signals. Since the message cannot generally be recorded on any other receiving unit, they each being associated with different identifying codes, privacy will be maintained at the "receiving end" of the postal system, and substantially complete privacy from the sender to the recipient will be assured.

In accordance with the present invention, apparatus is included to provide an acknowledgement of receipt of a message transmission from the central post office or, alternatively, that such receipt has not occurred. As is additionally indicated in the pictorial representation of FIG. 1, a return circuit is provided from the home location 30 to the central office 20. This circuit also comprises a pair of cascaded radio links--one, 47, is an up-link radio beam from the home location antenna 31 to the satellite antenna 41, while the other, 48, is the down-link beam from the antenna 41 to the post office antenna 21. The operating frequency of the return up-link beam 47 may be designated $f_2$ and that of the down-link beam 48 may be designated $f_2'$. These two frequencies may differ from each other by the same order of magnitude as the 50 MHz. difference between the message communication frequencies $f_1$ and $f_1'$ and, furthermore, are preferably close to those frequencies so that the antenna directivities may be such as to provide essentially the same gain in both the "message" and "reply" directions. Frequencies $f_2$ and $f_2'$, for example, might be 2,600 and 2,650 MHz., respectively, when frequencies $f_1$ and $f_1'$ are 2,500 MHz. and 2,550 MHz.

According to this invention, furthermore, the return circuit is selected to be one having a band width very much less than the band width of the message transmission circuit and to exhibit a signal-to-noise ratio also of greatly reduced value. As will now become clear, by so specifying the characteristics of the return or acknowledgement circuits of the postal system, the reply transmitter at the home location 30 can be one requiring far less radiated power than is required by the transmitter situated aboard the orbiting satellite 40.

To be more specific, the overall signal power loss $L_{oa}$ between the terminals of the satellite antenna 41 and the home location antenna 31 (in either "up" or "down" directions) is given in decibels (db.) by the equation:

$$L_{oa} = 20 \log_{10} \frac{4\pi R}{\lambda} - 10 \log_{10} \frac{4\pi A_t}{\lambda^2} - 10 \log_{10} \frac{4\pi A_r}{\lambda^2} \quad (1)$$

in which $R$ is the signal path length, $\lambda$ is the signal wavelength, $A_t$ is the effective area of the satellite antenna 41, and $A_r$ is the effective area of the addressee antenna 31. For a home receiver location 30 in temperate latitude and with a satellite in synchronous equatorial orbit on the same meridian, it can be shown that the first term in the right-hand member of equation (1), i.e., the power loss in free space transmission due to beam spreading, is approximately 191 db. when the satellite transmitter frequency $f_1'$ is 2,550 MHz.

The last two terms in equation (1) represent the signal power gain provided by the antennas 41 and 31, respectively. Where the satellite antenna 41 has a diameter of 3.3 meters (so as to illuminate a ground area of $6 \times 10^5$ square statute miles), the power gain it provides at the specified 2,550 MHz. frequency can be shown to be about 37 db. Where the addressee antenna 31 has a 1 meter diameter, the power gain it provides at the 2,600 MHz. $f_2$ frequency will be approximately 26 db. The overall power loss $L_{oa}$ between antennas 41 and 31, therefore, is of the order of 128 db. Since frequencies $f_1$, $f_1'$, $f_2$ and $f_2'$ are all comparably close in value, there will be substantially little difference in atmospheric signal attenuation for the "up" and the "down" communication links 46 and 48. The 128 db. overall loss, then, will be the same for both links 46 and 48.

The minimum receiver carrier power in decibels above 1 watt (dbw.), on the other hand, is given by the expression:

$$P_{rt} = P_{rn} + \rho \quad (2)$$

where $P_{rt}$ is the receiver carrier power, $\rho$ is the minimum signal-to-noise ratio in decibels, and $P_{rn}$ is the noise power of the receiver as given by the equation:

$$P_{rn} = \eta_F + \log_{10}\Delta f - 204 \quad (3)$$

$P_{rn}$, in this equation, represents the noise power in decibels above 1 watt, $\eta_F$ represents the noise factor in decibels, $\Delta f$ is the intermediate frequency band width in hertz, and 204 is the decibel equivalent of a $kT\Delta f\eta_F$ factor, where $k$ is Boltzmann's constant and T is the absolute temperature in degrees Kelvin. The minimum transmitter power in decibels is then given by the expression:

$$P_{to} = L_{oa} + P_{rt} \quad (4)$$

in which $L_{oa}$ and $P_{rt}$ are as previously defined.

Assuming that the band width $\Delta f$ of the addressee's home receiver is of the order of 10 MHz. (in order to provide facsimile resolution of television quality) and that the associated noise factor $\eta_F$ is 6 db., it can be shown that the noise power of the home receiver $P_{rn}$ equals −128 dbw. Assuming further that the minimum signal-to-noise ratio $\rho$ is 20 db., it follows that the minimum carrier power $P_{rt}$ is −108 dbw. Since the overall transmission loss $L_{oa}$ equals 128 db. for the "down" communication link 46, the minimum power requirement $P_{to}$ for the satellite transmitter 41 is +20 dbw, or 100 watts.

With the acknowledgement or return circuit of the present invention operating with a reduced band width and with a lower signal-to-noise ratio, on the other hand, the following comparisons can be made. First, assuming the reduced band width $\Delta f$ of the satellite unit receiving the addressee's reply transmission to be of the order of 10 kHz., and with an associated 4 db. $\eta_F$ noise factor, the noise power of the satellite receiver $P_{rn}$ can be shown to be −160 dbw. Second, assuming the lowered signal-to-noise ratio $\rho$ to be 12 db. due to a lowered carrier-to-noise threshold for this link in the transmission system, the minimum carrier power $P_{rt}$ equals −148 dbw. Noting that the transmission loss $L_{oa}$ for the "up" communication link 48 is the same 128 db. as for the "down" link 46, the minimum power requirement $P_{to}$ for the addressee transmitter 31 is −20 dbw., or 10 milliwatts.

Thus, by appropriate selection of return circuit band width $\Delta f$ and signal-to-noise ratio $\rho$, the return communication circuit can be one requiring one ten-thousandth the message communication power. The 10 kHz. band width assumed was selected so as to provide a transmitter whose frequency can be easily stabilized and a short reply time (0.1 milliseconds).

These above quantities are summarized in the following table:

| Quantity | Down-link 46 | Up-link 48 |
|---|---|---|
| Receiver bandwidth $\Delta f$ | 10 MHz. | 10 kHz. |
| Receiver noise factor $\eta_F$ | 6 db. | 4 db. |

| | | |
|---|---|---|
| Receiver noise power $P_{rn}$ | −128 dbw | −160 dbw |
| Minimum signal-noise ratio $\rho$ | 20 db. | 12 db. |
| Minimum receiver carrier power $P_{ri}$ | −108 dbw | −148 dbw |
| Overall loss $L_{oa}$ | 128 db. | 128 db. |
| Required transmitter power $P_{to}$ | +20 dbw or 100 watts | −20 dbw or 10 milliwatts |

Figure 2:
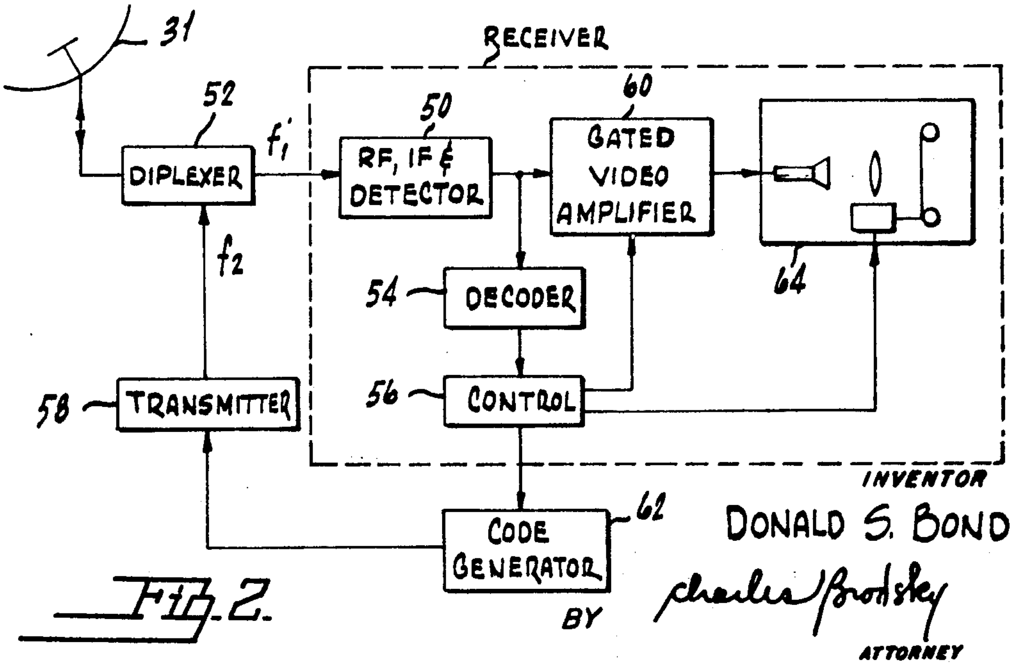
FIG. 2 is a block diagram of the receiving and transmitting portion of that postal system situated at the addressee's location in accordance with the present invention.

The receiving and transmitting portion of the postal system situated at the addressee location, as shown in FIG. 2, includes a radiofrequency, intermediate frequency and detector circuit unit 50. Radio mail messages relayed by the satellite antenna 41 to the addressee location 30 along the down-link 46 are intercepted by the antenna 31 and are coupled to the unit 50 by means of a diplexer 52. A decoder 54, coupled to the output of the unit 50, interrogates each received message to select for facsimile reproduction those messages having the particular code which corresponds to that receiver location. When the receiver apparatus is turned ON to "listen" for its address code, the unit 54 provides a signal to a control block 56. This block 56 responds by providing a second signal indication to a code generator unit 62 which, in turn, provides an output directed by way of a transmitter 58, the diplexer 52 and the antenna 31 to the central post office 20. This output is of the type indicating that the receiver is ready to record facsimile message communications and that such transmissions should begin.

Upon receipt of the proper code signal, the unit 54 provides an additional output signal to the control block 56, which in turn responds to enable a gated video amplifier 60 to couple the message to the recorder 64. Upon receipt of an "end of message" timing signal in the communication, the decoder unit 54 provides a second signal to the block 56 to disable the video amplifier 60 and the recorder 64. A further output signal is, at the same time, provided to the generator unit 62 for transmission of another code signal to the post office indicating complete reception of the message transmission. As is noted in the drawing (FIG. 2), the signal received by the addressee antenna 31 is of the $f_1'$ frequency while that transmitted by the antenna 31 is of the $f_2$ frequency. The transmitter 58 at the addressee location will be understood to be one having the power, frequency, band width, and signal-to-noise ratio characteristics described above.

Figure 3:
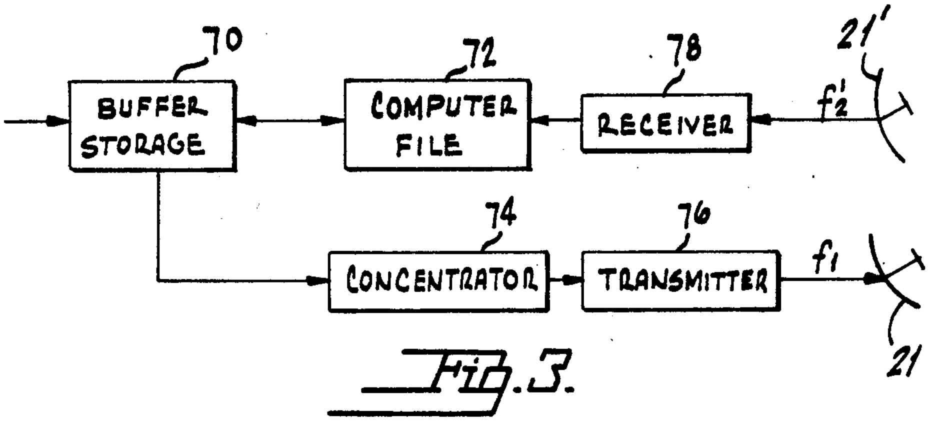
FIG. 3 is a block diagram of the corresponding apparatus at the central post office according to the invention.

The apparatus located at the central post office 20, as shown in FIG. 3, includes a buffer or information storage unit 70 (such as a magnetic tape recorder), a data processing or computer code file unit 72, a concentrator unit 74, an associated transmitter 76, and the antenna 21. In the manner described in my Ser. No. 701,642 application, (U.S. Pat. No. 3,594,495), these units cooperate to receive the video signals from the "electronic mailbox" scanners indicative of the message to be transmitted, to combine those signals with code signals uniquely identifying the addressee location, to route all such signals in numerical sequence to the appropriate transmitter for that geographic location, and to radiate such signals, at the $f_1$ frequency for example, at the satellite 41 serving such geographic area. The apparatus further includes a narrow band receiver 78, coupled to an antenna 21' and operating at the $f_2'$ reply frequency, to receive the code signals transmitted by means of the addressee antenna 31. Upon receipt of the code signal indication that the receiver is in readiness for message recording, the units 21' and 78 cooperate to provide the data processing computer file 72 with information as to the identity of the particular addressee seeking "mail delivery." The computer 72 in turn transmits instructions to the information storage unit 70 serving his location to begin transmission of all messages intended for the addressee. Upon receipt of the code signal acknowledging complete reception of the transmission, the computer 72 responds to instruct the unit 70 to erase the message information stored therein as having been successfully communicated. Computer 72 may be programmed to cause storage unit 70, concentrator 74 and transmitter 76 to repeat the message transmission until a code signal acknowledgement of a complete reception is received or, alternatively, to provide some indication that a transmission attempt has proven unsuccessful if no acknowledgement signal is received within a reasonable time. Corrective steps to remedy any such situation, though outside the scope of the present invention, may then be taken.

Figure 4:
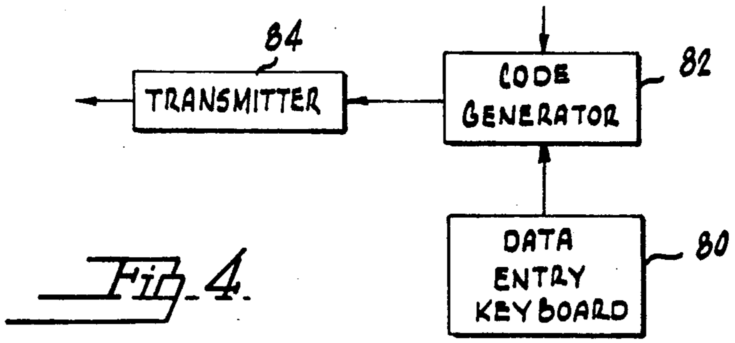
FIG. 4 is a block diagram of a portion of the apparatus at the addressee's location useful in interrogating the central post office to forward message information of a kind desired by the addressee.

Another mode of operation of the radio postal system constructed according to the present invention is indicated by the block diagram of FIG. 4. Here, a message can originate at the home location, being of the type, for example, as the request, "Have you any transmissions for me?" Alternatively, it can comprise an instruction to the central office to provide such data as the facsimile of a book, periodical, or other graphic material. In this mode, the central office can forward the message request over another circuit to a central public library or other source, and can transmit a facsimile of it to the addressee upon receipt of the requested graphic from the appropriate source. In FIG. 4, the data entry keyboard 80, the code generator 82 coupled to its output, and the transmitter 84 (the latter two units being the counterparts of those shown in FIG. 3), comprise a means of entering the addressee's request data. The request data may include the addressee's code and a designation code or call number for the book, periodical, or graphic he desires.

In summary, there is herein disclosed a method of two-way communication for a radio main system in which a narrow-band, low-power reply circuit is used to relay brief messages via a satellite repeater to a central office where high-speed facsimile transmissions originate. A decoder in the addressee's receiver controls the automatic transmission of reply signals which are received and stored at the central office to control the transmission, repetition and erasure of messages intended for communication.

I claim:

1. In conjunction with a radio postal system of the type including an orbiting satellite having a transmitter and antenna for relaying message communications in a video signal format from a first ground station to a second ground station where recording is desired and wherein each of said message communications includes an electrical coding signal identifying said second ground station to receive said communications and an electrical timing signal identifying the state of completion of said message communications, the combination comprising:

means cooperating with said second ground station for receiving said video signal message communications and for providing video signals representative of the relayed message information as an output thereof for recording at said second station;

means at said second ground station coupled to said cooperating means and coded to respond only to those video signal message communications including that particular identifying signal associated therewith, and further responsive to the presence of said relayed timing signal to provide a signal indication as to the extent of receipt of said message communications;

and circuit means coupled to said last-mentioned means and including a code signal generator and second transmitter responsive to the provision of said extent of receipt signal for relaying a control signal indicative thereof and of the particular ground station receiving said communication to said first ground station via said orbiting satellite to control the message communications therefrom, said circuit means including said second transmitter being selected to radiate signals from said second ground station to said satellite transmitter within a bandwidth substantially less than the band width of signals radiated to said second ground station from said satellite transmitter.

2. The combination as defined in claim 1 wherein said second transmitter relays said control signal indications from said second ground station to said first ground station with a signal-to-noise ratio less than the signal-to-noise ratio with which said satellite transmitter relays said message communications from said first ground station to said second ground station.

3. The combination as defined in claims 1 or 2 wherein said means coupled to said cooperating means provides an "end of message" control upon receipt of an electrical timing signal indicating completion of said message communications and wherein said second transmitter relays a corresponding control signal to said first ground station via said orbiting satellite directing the termination of said message communications.

4. The combination as defined in claims 1 or 2 wherein said satellite and said second transmitters exhibit comparable operating frequency differences between their transmit and receipt modes so as to enable substantially comparable power gains to be provided by said satellite transmitter as is provided by said second transmitter.

5. The combination as defined in claims 1 or 2 wherein said means coupled to said last mentioned means also includes a second antenna for relaying said control signal indication to said first ground station via said satellite transmitter and antenna.

* * * * *